(No Model.)

A. LIETZ.
MATHEMATICAL INSTRUMENT.

No. 557,333. Patented Mar. 31, 1896.

Witnesses:

Inventor:

Adolph Lietz
by John Richards
Atty

UNITED STATES PATENT OFFICE.

ADOLPH LIETZ, OF SAN FRANCISCO, CALIFORNIA.

MATHEMATICAL INSTRUMENT.

SPECIFICATION forming part of Letters Patent No. 557,333, dated March 31, 1896.

Application filed September 6, 1894. Serial No. 522,297. (No model.)

*To all whom it may concern:*

Be it known that I, ADOLPH LIETZ, a citizen of the United States, residing in the city and county of San Francisco, State of California, have invented certain new and useful Improvements in Mathematical Instruments; and I hereby declare the following specification and the drawings therewith to be a complete description of my invention, with the manner of constructing and applying the same.

My improvements relate to a cyclotomic transit, an improved method of measuring scale-graduations and devices therefor by means of shifting the base-point or zero, from which readings are made, and setting this point at any arbitrary line of the graduated scale, which point thereby becomes the starting place or base for measurements to be made.

My invention consists in providing in transits, theodolites, or other instruments for measuring angles or indicating quantities by graduated scales, an auxiliary adjustable scale that can be set so that all readings will be made from a zero-point placed on any arbitrary line of the fixed graduation and that the readings may become complete quantities without subtraction or comparison, thus facilitating the work to be done with such mathematical instruments, and saving the time required for computation in recording results.

Other objects of my invention besides those already named are the avoidance of a compound or double center or pivot, such as is commonly provided in transits or other instruments of the kind by means of solid and annular concentric spindles, one within the other, providing for two adjustments around the main axis of the instrument. My improvement renders these double spindles unnecessary, simplifies construction, and reduces the number of parts.

Figure 1:
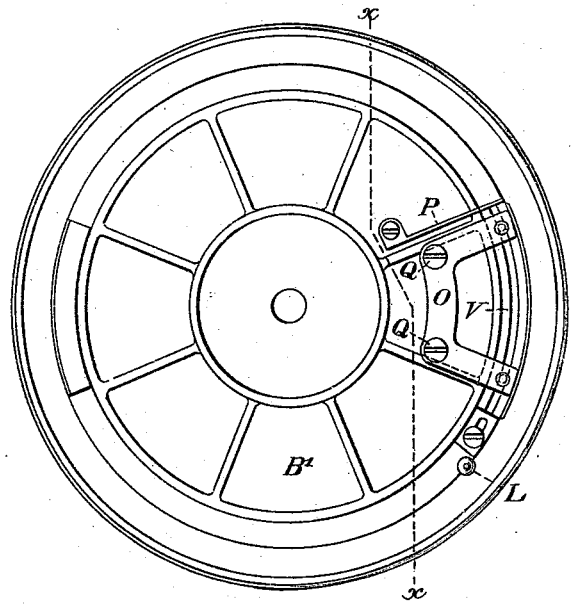
Figure 2:
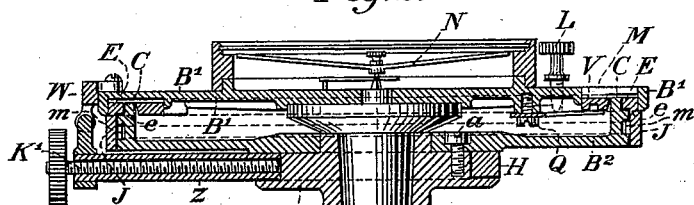
Figure 6:
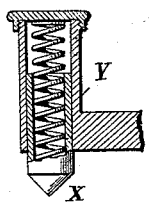
Figure 5:
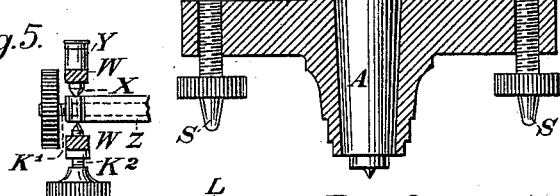
Figure 3:
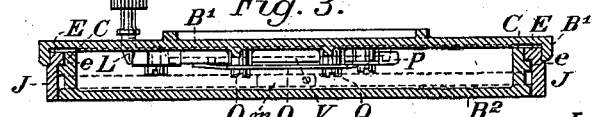
Figure 4:

Referring to the drawings herewith, illustrating the application of my invention to an instrument for measuring angles, Figure 1 is a plan view on the bottom of the main member or plate of the instrument. Fig. 2 is a central vertical section through the axis of the instrument, showing its spindle and other members in their respective positions and relations. Fig. 3 is a section on the line $x\ x$ of Fig. 1, looking from the center. Fig. 4 is a broken detail showing the scales from which readings are made. Fig. 5 is a top view of the ordinary devices for tangential adjustment of the sight instrument. Fig. 6 is a detail view in section, showing the construction of the yielding point in Fig. 5.

Similar letters of reference are employed to designate corresponding parts in the different figures of the drawings.

The main supporting member D is of the ordinary form and arranged to rest on a tripod in the usual manner and is provided with the usual leveling-screws S S, and a socket for the spindle A, as seen in Fig. 2. The subplate $B^2$ is firmly attached to the casting D by means of screws $a$, and remains as a fixed and rigid part of the instrument. Around its circumference is an annular flange C graduated on top, as seen in Fig. 4, and hereinafter referred to as the "fixed" scale C.

The top plate B', on which the usual sights are fixed, revolves on the spindle A, its motion being arrested and this plate with the sights being firmly held in any position by means of the screw K' and a clamp-collar H fitting around a neck or channel in the main member D, as seen in Fig. 2. As, however, the point at which this plate is clamped may not be accurate in respect to the desired line of sight, a tangential movement is provided for accurate adjustment, as shown in Fig. 5.

Connection between the yoke H and the plate B' is by means of the bracket W, supporting at one side a point X pressed outward by a coil-spring in the tube Y, and on the other side a screw $K^2$, both pressing upon the extension Z of the yoke H, as shown in the drawings.

By turning the screw $K^2$ forward the point X recedes, and the converse, as is common in adjustments of this kind.

Through the plate B' is an opening or sightway M, as shown in Fig. 2, for observation of the graduation on the scales E C; also the vernier V, as seen in Fig. 4. The top of the subplate C, appearing from above as a narrow ring, is graduated into degrees and their subdivisions.

The scale E is marked or graduated on the top edge of the movable collar-ring J, fitting around the circumference of the subplate B² and held by a ledge e, as seen in the sections, Figs. 2 and 3.

The collar J and the scale E made thereon are arranged to revolve by hand, the exterior of the collar J being milled for that purpose.

The top of the ring E is graduated by lines, indicating every tenth degree, fifth degree, or less, if desired, the ten-degree or other division being designated by figures indicating the number of degrees from zero, as shown in Fig. 4. In this manner the zero-mark may be set to correspond with any line on the plate C around its circumference.

In a groove around the periphery of the subplate B² are placed springs m, bearing upon the interior of the collar-ring J, to cause friction and prevent it being moved by accident.

In an ordinary transit, theodolite, sextant, or other instrument of this character, as commonly arranged, the fixed scale is a complete circle, containing lines, figures, and divisions; but in my invention the scale is severed, and the figures indicating the measured distances from a starting-point may be shifted to any part of the circle.

The vernier V is of ordinary construction and slightly adjustable, so that its zero-point may be shifted to the extent of one division of the lower plate C. This vernier is shown in Figs. 1, 2, 3, and 4.

Fig. 1 shows the back of the upper plate B' and the devices for supporting and sliding the vernier to the right or left by means of a conical screw L. (Shown in Fig. 3.) Turning this screw downward pushes the vernier V against the spring P at the other end, and raising the screw releases the spring, and the spring P forces the vernier backward toward the screw L. The vernier V is supported by a flexible bracket or plate O, held by the screws Q Q, as shown in Fig. 1. These devices insure a motion of one circle-division in a plane parallel to the plate C.

Fig. 2 shows the entire mounting, including the compass-box G and needle N, which is added to show the relative position of the usual working parts. To measure any angle in a horizontal plane from any point between any other two points, the transit is set up in the ordinary way and made level. A telescope or visual device attached to the plate B' is directed to the point to be measured from. When properly alined, the movement of the plate B' about the spindle A is arrested and the plate fixed by means of the screw K' and the clamp-collar H. The point to be sighted from is here bisected by means of the tangent-screw K². The telescope now points to the direction which is to be noted as the starting or zero point of the scale system. The vernier V may, however, from the last motion of the plate B', have an arbitrary position in reference to the series of figures on the scale E, and the vernier is then adjusted by means of the screw L, so that its zero-line will coincide with the nearest division-line of the plate C. The ring E is next turned until the zero-mark of its scale will correspond with the zero line or point of the vernier V. The instrument is now oriented for the direct measurement.

To measure any angle the clamp K' is released, whereupon the upper plate B' with the telescope thereon may be turned in any desired direction, the vernier V moving with the plate B' and indicating the amount of angular measure from the direction to which the instrument was first set. This is accomplished directly without any arithmetical deduction or correction.

It will thus be seen that the elements of revolution for the scales are reduced to a single spindle or axis, but retaining in a more convenient form all the required adjustments of the instrument, and, as before pointed out, the avoidance of computation after readings are made.

In the case of single-center instruments, as hitherto made, two readings are required for every observation. For example, if an angle was measured from a point 1 to a point 2, this angle was first read at the point 1, the vernier, for instance, reading toward 1 36° 48'. Then the instrument was turned to the point 2 and the vernier would read 184° 56'. The angular measure between 1 and 2 would therefore be 184° 56'−36° 48'=148° 8'.

With my improvements the subtraction of one angle from the other is not required. When the sight is on the point 1, the ring E and vernier V are set at zero and the telescope is turned in the direction of the point 2. Then the reading on the scales through the sightway M shows at once 148° 8', and no computation is necessary.

Having thus described the nature and objects of my invention, what I claim as new, and desire to secure by Letters Patent, is—

1. In an instrument for measuring or determining angles, the combination of a fixed plate having an upturned flange bearing scale-graduations, a superimposed revolving plate, a loose collar-ring surrounding said fixed plate outside of the flange and supported thereby, said collar-ring also bearing scale-graduations, an adjustable vernier operating in connection with said scales and a single axis or center, upon which the movable plate revolves, substantially as and for the purpose herein described.

2. In an instrument for measuring or determining angles, the combination of the fixed plate bearing scale-graduations, a loose collar-ring, also bearing scale-graduations, surrounding said plate and supported thereby outside of the graduations of the fixed plate, a superimposed revolving plate carrying an adjustable vernier operating in connection with said scales, and a clamp-collar having a clamping-screw, whereby the movable plate is secured in any desired position, substantially as and for the purpose herein set forth and described.

3. In an instrument for measuring or determining angles, the combination of a fixed plate bearing scale-graduations, a collar-ring surrounding said plate and supported thereby outside of the graduations of the fixed plate, and also bearing scale-graduations, a superimposed revolving plate provided with an adjustable vernier, and a clamp-collar having a horizontal extension carrying a clamping-screw, and a bracket attached to the revolving plate provided with adjusting mechanism operating in connection with said horizontal extension, whereby a tangential movement is secured for accurate adjustment, substantially as and for the purpose described.

4. In an instrument for measuring or determining angles, the combination of a fixed plate bearing scale-graduations only, a movable collar-ring surrounding said plate and adjacent to the fixed scale and having a scale provided with figures corresponding to the graduations on the fixed scale, and an adjustable vernier located within the fixed scale also carrying a scale provided with figures corresponding to the graduations on the fixed scale, whereby the zero of the movable scale and the zero of the vernier may be adjusted to correspond with any graduation of the fixed scale and the measurement be read directly therefrom, substantially as and for the purpose herein set forth and described.

5. In an instrument for measuring or determining angles, the combination of a collar-ring bearing scale-graduations, a movable plate, a fixed plate also having scale-graduations, and an adjustable vernier within the fixed plate and collar-ring provided with means of adjustment for sliding the vernier one division of said fixed plate, substantially as and for the purpose herein set forth and described.

In testimony whereof I have hereunto affixed my signature in the presence of two witnesses.

ADOLPH LIETZ.

Witnesses:
ALFRED A. ENQUIST,
WILSON D. BENT, Jr.